US011178120B2

United States Patent
Lyndon-James et al.

(10) Patent No.: US 11,178,120 B2
(45) Date of Patent: Nov. 16, 2021

(54) SYSTEM AND METHOD FOR CIRCUMVENTING ADVERTISEMENT BLOCKERS

(71) Applicants: Perry Lyndon-James, Crows Nest (AU); Scott Paul Lawrence, Surry Hills (AU); Malcolm Gerrard Treanor, Northbridge (AU)

(72) Inventors: Perry Lyndon-James, Crows Nest (AU); Scott Paul Lawrence, Surry Hills (AU); Malcolm Gerrard Treanor, Northbridge (AU)

(73) Assignee: WINR Corporation Pty Ltd, North Sydney (AU)

( * ) Notice: Subject to any disclaimer, the term of this patent is extended or adjusted under 35 U.S.C. 154(b) by 116 days.

(21) Appl. No.: 16/789,021

(22) Filed: Feb. 12, 2020

(65) Prior Publication Data
US 2021/0250335 A1 Aug. 12, 2021

(51) Int. Cl.
G06F 15/16 (2006.01)
G06F 15/173 (2006.01)
H04L 29/06 (2006.01)
H04L 29/08 (2006.01)
H04L 29/12 (2006.01)

(52) U.S. Cl.
CPC ...... *H04L 63/0428* (2013.01); *H04L 61/1511* (2013.01); *H04L 61/3025* (2013.01); *H04L 67/02* (2013.01); *H04L 67/28* (2013.01)

(58) Field of Classification Search
USPC .......................................... 705/14.73, 14.58
See application file for complete search history.

(56) References Cited

U.S. PATENT DOCUMENTS

| | | |
|---|---|---|
| 9,531,666 B2 | 12/2016 | Jungck |
| 9,679,315 B2 | 6/2017 | Carasso |
| 10,102,301 B2 | 10/2018 | Holloway et al. |
| 10,257,253 B1 * | 4/2019 | Freedman .............. H04L 67/02 |
| 10,275,840 B2 | 4/2019 | Kagan et al. |
| 2011/0119386 A1 * | 5/2011 | Murrett ................ H04L 67/104 |
| | | 709/227 |

(Continued)

*Primary Examiner* — Jude Jean Gilles
(74) *Attorney, Agent, or Firm* — Eandi Fitzpatrick LLP

(57) ABSTRACT

A system and method to circumvent advertisement blockers using a proxy server is disclosed. The method describes loading, in response to a request from a user device browser to a website, an ad-detection element from a proxy server to the publisher server; detecting, utilizing the loaded ad-detection element from the proxy server, whether the web site is running the advertisement blocker; if an advertisement blocker is detected, receiving a modal request at the proxy server from the publishing server; outputting, from the proxy server, a modal parameter request to an ad management server for modal configuration parameters; returning, based on the modal parameter request, an ad unit response from the ad management server having the configuration parameters; generating a modal using the proxy server; sending the modal to the user device browser for consumption by the user; and modifying an interface parameter in the user device browser to o display the modal with the ad unit contained therein. A system to circumvent advertisement blockers is also described herein.

20 Claims, 15 Drawing Sheets

(56) References Cited

U.S. PATENT DOCUMENTS

| | | | |
|---|---|---|---|
| 2011/0282997 A1* | 11/2011 | Prince | G06F 40/14 |
| | | | 709/226 |
| 2012/0117239 A1* | 5/2012 | Holloway | H04L 63/0884 |
| | | | 709/226 |
| 2012/0324113 A1* | 12/2012 | Prince | H04L 69/40 |
| | | | 709/226 |
| 2016/0140626 A1* | 5/2016 | Agarwal | G06Q 30/0276 |
| | | | 715/234 |
| 2017/0109797 A1 | 4/2017 | Boffa et al. | |
| 2017/0237823 A1 | 8/2017 | Pyper | |
| 2018/0101507 A1* | 4/2018 | Malca | G06F 40/103 |
| 2018/0102507 A1 | 4/2018 | Kuang | |
| 2018/0204225 A1 | 7/2018 | Bennefeld | |
| 2019/0215308 A1 | 7/2019 | Feyzibehnagh et al. | |

* cited by examiner

SYSTEM AND METHOD FOR CIRCUMVENTING ADVERTISEMENT BLOCKERS

FIELD OF THE INVENTION

The present disclosure relates to marketing and advertising systems and methods. More particularly, the invention relates to a system and method to detect ad-blocking, and if detected, construct a modal with third party advertising content using a proxy server.

BACKGROUND OF THE INVENTION

Publisher websites such as newspaper web pages, television station web pages, web log web pages, magazine web pages, social networking web pages, microblogging web pages, and other internet-based online publishing sources may generate significant income using advertising content. In fact, in the last twenty-five years, publishers have been forced to move toward generating almost all of their revenue from third party web-based advertising. Publishers use revenue from advertising to help support their business, and thus to reduce or eliminate the cost to their customers (or audience members). Some publisher's existence depends upon the income generated from the display of advertisements alongside the webpage content.

The advent of web-based banner ads in the mid 1990's disrupted the entire industry. In 1995, AT&T paid HotWired $30,000 to place the banner ad above on their site for three months. The ad has a click-through-rate of 44% at the time, and since, the average clickthrough rate on display ads today is closer to 0.06%. Due to low clickthrough rates, publishers that have depended upon this revenue stream have been forced to adapt.

Today, many publishers rely on native advertising for spoon-feed content because it is more normalized and user friendly, but even then, publishers do not recognize the revenue or impressions they need to succeed. Further, because online advertisements are sometimes deemed to be a nuisance by users, Ad-Blockers became prevalent, and instead just use advertisement blocking to prevent the most "intrusive" forms of advertising on the Internet. Indeed, currently most all browsers offer some ways to remove or alter advertisements: either by targeting technologies that are used to deliver ads (such as embedded content delivered through browser plug-ins or via HTML5), targeting URLs that are the source of ads, or targeting behaviors characteristic to ads (such as the use of HTML5 autoplay of both audio and video).

As a by-product of this approach nearly all advertising may be blocked, which prevents publishers from monetizing almost the entire portion of users on their site who use advertisement blocking even though many consumers recognize the fact that publishers need to display advertising in order to stay in business and produce content. Many users are not opposed to all forms of advertising and will interact with advertising with the knowledge that they will be able to consume the content they desire at no charge. Further, publishers are not able to monetize their content without advertisers, and as such, different methods have been developed to simply bypass these Ad blockers.

For example, U.S. Pat. No. 9,679,315 to Carasso, entitled "Systems and Methods to Bypass Online Advertisement Blockers" discloses an adblocking bypass system for ensuring that advertisements are loaded and presented on a user device running one or more adblockers. The adblocking bypass system is comprised of a bypass loader and a bypass proxy. The bypass loader is a component that is embedded within content publisher content. When the content publisher content is downloaded and parsed by a user device, the bypass loader executes by detecting the presence of any adblocker on the user device. If found, the bypass loader forwards any blocked advertisement calls to the bypass proxy. The bypass proxy retrieves the requested advertisements and returns them to the bypass loader which then reintroduces the advertisements in final content presentation or rendering.

US Patent Application 20170237823 to Pyeper entitled "System and Method for Transforming Online Content" discloses a system and method for transforming online content circumventing online content between a web server and an end-user computing device is provided. The system includes a bypass server comprising one or more processors and a data storage device communicatively linked to the one or more processors, the one or more processors executable to receive online content from the web server; circumvent portions of the online content to obfuscate supplemental content from primary content; and transmit the online content having the circumvented portions to the end-user computing device.

However, these existing solutions have drawbacks, and as such, there is a need for a system and method to automatically, effectively, and efficiently provide advertising to consumer from third party advertisers on a publisher's webpage.

SUMMARY OF THE INVENTION

To achieve the foregoing and other aspects and in accordance with the purpose of the invention, the subject system provides a system and method to circumvent advertisement blockers using a proxy server.

In one embodiment, the system comprises a proxy server having an ad-detection element residing thereon, wherein in response to a request from a user device browser to a website, the proxy server loads the ad-detection element; a publisher server in communication with the proxy server, wherein the publisher server requests the proxy server to detect an advertisement blocker, and further wherein the publisher serer receives the ad-detection element from the proxy server; wherein the proxy server: detects utilizing the loaded ad-detection element, whether the website is running the advertisement blocker; if an advertisement blocker is detected, receiving a modal request from the publishing server; outputs a modal parameter request to an ad management server for modal configuration parameters; receives, based on the modal parameter request, an ad unit response from the ad management server having the configuration parameters; generates a modal; and sends the modal to the user device browser for consumption by the user; wherein the publishing server modifies an interface parameter in the user device browser to display the modal with the ad unit contained therein.

In another embodiment, the system comprises a publisher server configured to serve an advertisement blocker (ad-blocker) detection JavaScript code from a proxy server to a user device that has been pre-configured with the same top-level domain (TLD) as the primary publisher server (to avoid detection by ad-blockers) to detect if a browser is configured with ad-blocking software. The advertisement blocker detection JavaScript element detects the user device comprising advertisement blocker, and in response to the ad-blocker, the JavaScript encrypts and obfuscates the content of the webpage—rendering it unreadable to the user device—and displays an inline ad unit. The inline ad unit comprises an option to unlock the content of the webpage by interacting with the advertisement or page that was blocked (this could be a video ad that must be played for a number of seconds, interactive content, etc.). The proxy server determines the inline ad unit configuration via an API call to an advertisement management server, which would obtain the publisher configuration data from a publisher configuration database. The advertisement management server derives an API call (via the Internet) to either a third-party advertisement (Ad) server or a supply-side platform to obtain a suitable ad unit, based on the publisher configuration data. An ad-unit may be any media.

The devices associated with the system and any other device described herein may exchange information via any communication network.

In one embodiment, the method to detect and circumvent, and in series, advertisement blocker into a usable modal is disclosed. In embodiments, the method comprises loading, in response to a request from a user device browser to a website, an ad-detection element from a proxy server to the publisher server; detecting, utilizing the loaded ad-detection element from the proxy server, whether the website is running the advertisement blocker; if an advertisement blocker is detected, receiving a modal request at the proxy server from the publishing server; outputting, from the proxy server, a modal parameter request to an ad management server for modal configuration parameters; returning, based on the modal parameter request, an ad unit response from the ad management server having the configuration parameters; generating a modal using the proxy server; sending the modal to the user device browser for consumption by the user; and modifying an interface parameter in the user device browser to o display the modal with the ad unit contained therein. The present provides a user a greater degree of control over their "ad-funded" experience while simultaneously having the publisher's needs appropriately contextualized.

In an embodiment, a non-tangible, computer-readable medium storing instructions, that, when executed by a processor, cause the processor to perform a method to circumvent advertisement blocking associated with a communication network is provided. The method comprises loading, in response to a request from a user device browser to a website, an ad-detection element from a proxy server to the publisher server; detecting, utilizing the loaded ad-detection element from the proxy server, whether the web site is running the advertisement blocker; if an advertisement blocker is detected, receiving a modal request at the proxy server from the publishing server; outputting, from the proxy server, a modal parameter request to an ad management server for modal configuration parameters; returning, based on the modal parameter request, an ad unit response from the ad management server having the configuration parameters; and generating a modal using the proxy server; sending the modal to the user device browser for consumption by the user; and modifying an interface parameter in the user device browser to o display the modal with the ad unit contained therein.

The system provides an experience that is more natural and native without the issues associated with sponsored ads.

The system obviates the publishers' fears over displaying ads to users because user has directly opted in, and thus may ultimately open up more net inventory and increase engagement rates even further The system and method allow the user to select a convenient method to display an advertisement while accessing the webpage and increase the revenue of the publishers.

Other features, advantages, and aspects of the present system will become more apparent and be more readily understood from the following detailed description, which should be read in conjunction with the accompanying drawings.

BRIEF DESCRIPTION OF THE DRAWINGS

The present system is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
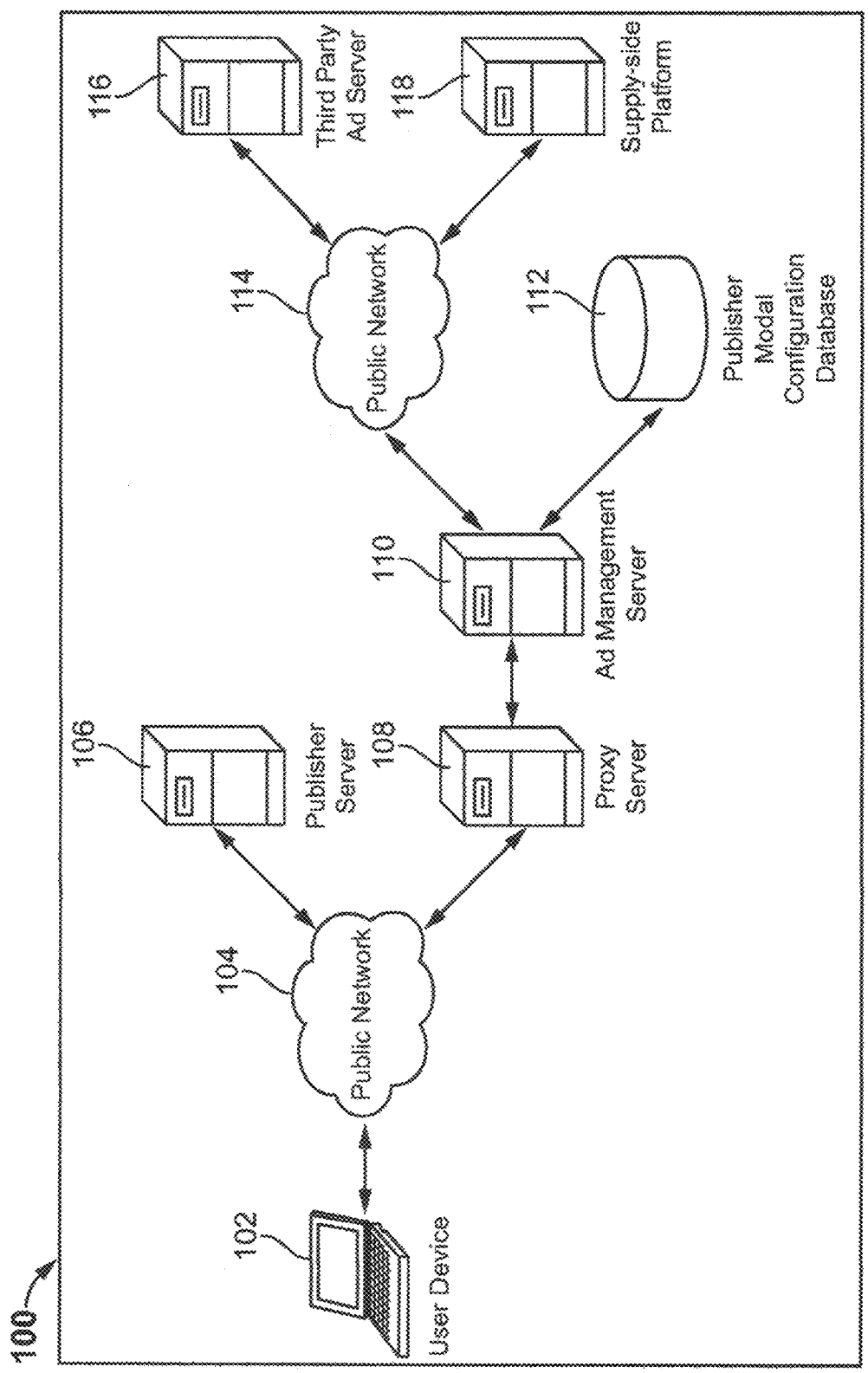
FIG. 1 illustrates an operating environment of a system to circumvent advertisement blockers, according to an embodiment of the present system.

The present system is best understood by reference to the detailed description and examples set forth herein.

Embodiments of the system are discussed below with reference to the examples. However, those skilled in the art will readily appreciate that the detailed description given herein with respect to these examples is for explanatory purposes as the system extends beyond these limited embodiments. For example, it should be appreciated that those skilled in the art will, in light of the teachings of the present system, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the system that are too numerous to be listed but that all fit within the scope of the system. Also, singular words should be read as plural and vice versa and masculine as feminine and vice versa, where appropriate, and alternative embodiments do not necessarily imply that the two are mutually exclusive.

It is to be further understood that the present system is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present system. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this system belongs. Preferred methods, techniques, devices, and materials are described, although any methods, techniques, devices, or materials similar or equivalent to those described herein may be used in the practice or testing of the present system.

The present system discloses a system and method to circumvent advertisement blockers. The system and method are configured to bypass the advertisement blocker of both in browser and adblocker plugins.

Referring to FIG. 1, an operating environment 100 of a system to detect advertisement blockers and in response, automatically generate a modal for a user according to an embodiment of the present system is disclosed. Depicted as part of the operating environment 100 are user device 102, publisher server 106, proxy server 108, advertisement management server 110, publisher model configuration database 112, third party advertisement server 116, and supply side platform 118. In operation, the elements referenced above and especially the publisher model configuration database 112 build and configure a modal in response to the detected ad blocker.

In operation, the content publishers operate one or more publisher servers 106 that host and deliver content across a public communication network 104, such as the internet. However, content publisher originated content can be hosted and served from other sources including content delivery networks (CDNs), cloud service providers, and caching or proxy servers operated by others independent of the content publishers.

As used herein, devices, including those associated with the system and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

In one embodiment, the user device 102 could be any device with a processor that runs a content processing, rendering, or presenting application. The user device 102 could include any of a laptop computer, smartphone, tablet, and desktop computing machine as some examples. The most common application for processing, rendering, or presenting the content is a web browsing application (e.g. Internet Explorer, Firefox, Chrome, and Safari web browsers—including browsers designed for ad-blocking, such as Brave Browser), although other applications running on the user device 102 could similarly process, render, or present the content publisher content. For the purposes of the discussion that it to follow, one or more adblockers are installed on the user devices 102 and running in conjunction with the content retrieval or content rendering application of the user devices 102.

According to the present system, the publisher server 106 receive a web page request from the user device or end user device 102, via the public network 104. A proxy server 108 is configured to exchange information with the publisher server 106 that communicates with the end user device 102. The publisher's server 106 is configured (via HTML tags) to serve an advertisement detection (hereinafter, referred as, ad-detection) element from the proxy server 108 to the end user device 102 via HTML tags. The ad-detection element has been pre-configured with the same Top-Level Domain (TLD) as the primary publisher website or publisher server 106, to avoid detection by advertisement blocker. The system provides a data routing scheme and protocol to build a modal of value based on the advertisement blocker.

The ad-detection element is configured to execute/run at the end user device 102 to detect the presence of advertisement blocker. In one embodiment, the ad-detection element is embodied as JavaScript, although other scripting languages or code could be used to implement the ad-detection element. In one embodiment, the ad-detection element is an advertisement blocker detection JavaScript element.

The ad-detection element detects the web page content and displays a modal. When constructing the modal, the ad-detection element would make an API request to the proxy server 108. The proxy server 108 determines the modal configuration via an API call to the advertisement management server 110. The advertisement management server 110 is configured to obtain the publisher configuration data from the publisher modal configuration database 112. The publisher modal configuration database 112 comprises information related to website content or webpage obfuscation method, modal displayed on the webpage and content of the modal.

The advertisement management server 110 would also make an API call (via the public network 114) to either a third-party advertisement server 116 or a supply-side platform 118 to obtain a suitable advertisement unit for the modal, based on the publisher configuration data. In various embodiments, the advertisement unit could be, for example, text, images, video, animations, hyperlinks, etc. that could be presented on the webpage. In some embodiments, advertisement management server 110 can select from among stored advertisement items based on advertisement criteria, such as, for example, geographic limitations, subject matter limitations, size limitations, ad dimensions, and/or media type limitations, etc. In one embodiment, the requests for advertisement or advertisement criteria is sent to either the third-party advertisement server 116 or the supply-side platform 118.

The system of the present system relays requests and responses made to advertisement server using publisher website's subdomain, for example, wan2001.publisher.com. In one embodiment, the requests and responses flow from publisher server 106 to advertisement management servers 110 via proxy server 108 through different subdomains pointing to advertisement management servers 110. A unique Subdomain is created for every publisher registered with WAN. Example: https://wan2001.publisher.com where 'wan2001' could be a unique ID to represent the publisher in WAN. The subdomain is setup and configured on publisher DNS manager pointing it to the proxy server 108. The filtering rules used to identify the request source and the final endpoints to where the request will be relayed. For example, if the proxy server 108 is using NodeJS as the server technology, URL package could be used to split the domain name and apply the necessary logic.

Figure 2:
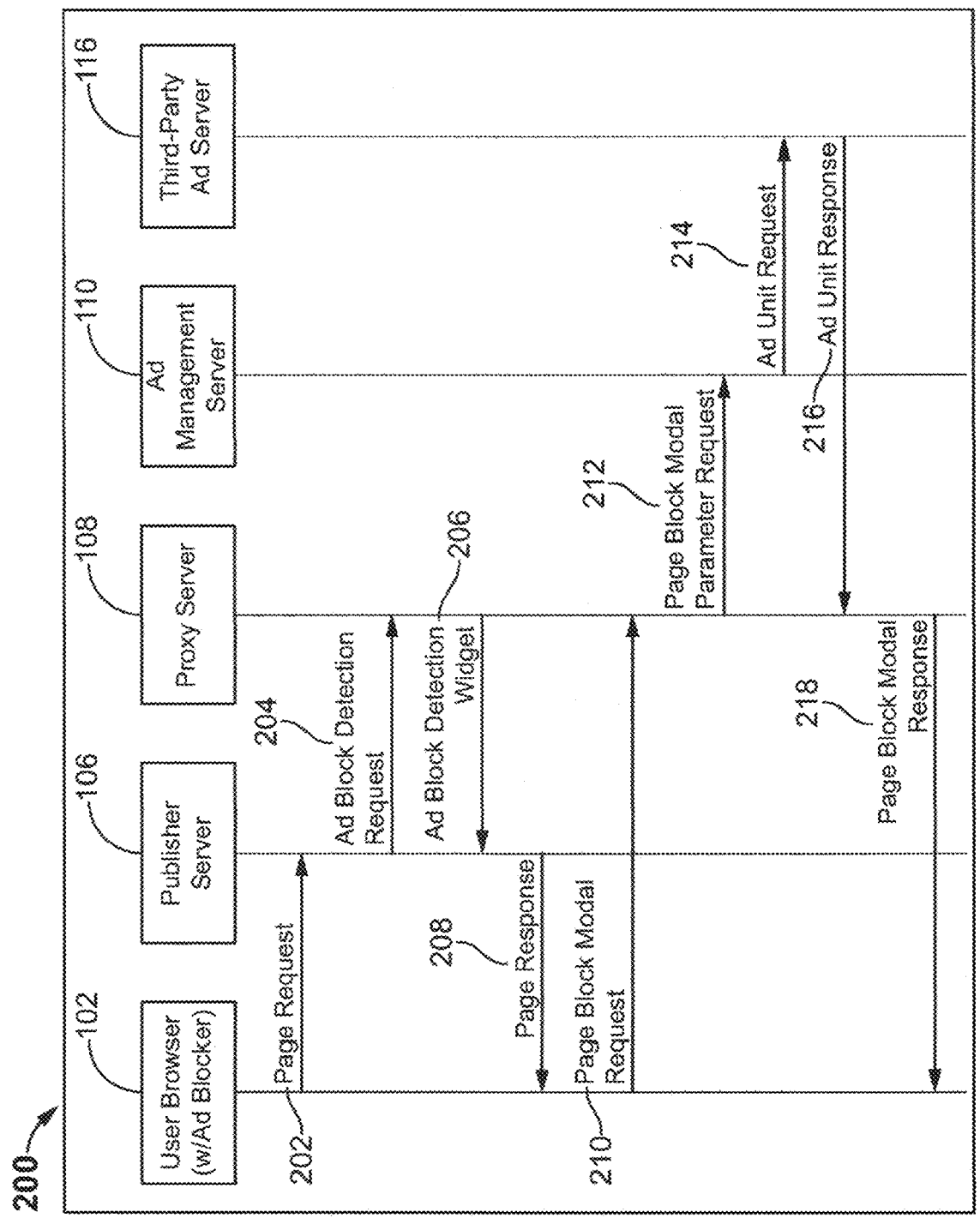
FIG. 2 illustrates a dataflow drawing of a method to circumvent advertisement blockers, according to an embodiment of the present system.

FIG. 2 exemplarily illustrates a dataflow 200 of a method to circumvent advertisement blockers into usable and digestible modals that are related to the original advertisements. As shown, messages are exchanged between the user device 102, publisher server 106, advertisement management server 110, proxy server 108 and third-party advertisement server 116. The user device 102 runs an adblocker in conjunction with a browsing application.

The message exchange commences when the user device 102 makes an HTTP request 202 of website content from the publisher website/publisher server 106. The publisher's website content includes HTML to load additional ad-detection element from the proxy server 108 via an HTTP request 202. In one embodiment, the ad-detection element is an advertisement blocker detection JavaScript or element. The proxy 108 returns the advertisement blocker detection JavaScript in the HTTP Response 206. The complete page response in then returned to the consumer in the Page Response 208.

The advertisement blocker detection JavaScript runs on the user's browser to determine whether or not they are running an ad blocker. If detected, the advertisement blocker detection JavaScript would make a page block modal request 210 API request to the proxy server 108 for configuration parameters.

The proxy server 108 is configured to request the modal configuration information/page block modal parameter request 212 from the advertisement management server 110 via an API request. The advertisement management server 110 makes an advertisement unit request 214. Based on the configuration, the advertisement management server 110 may call the third-party advertisement server 116 or the supply-side platform 118 to obtain an advertisement unit response 216. The proxy server 108 then returns the modal parameters in a response 218 to the advertisement block detection JavaScript. This JavaScript will then modify the Document Object Model (DOM) in the user's browser of the user device 102 to obfuscate the page content and display the modal with the advertising unit. In one embodiment, the editorial content obfuscation methods include, but not limited to: replacing the content text with encrypted characters, with the publisher's font replaced with an obfuscation font, and replacing the content text with encrypted characters, with an opaque overlay over the content. In one embodiment, the modal display methods include, but not limited to, inline display with the editorial content and a pop-up modal. In one embodiment, the content of the modal includes, but not limited to, a video advertisement, a banner advertisement, an interactive advertisement, instruction on whitelisting the publisher site in the advertisement block extension, instruction for subscribing to the publisher site to unlock the content of the webpage/website, and a method for micropayment to unlock the content.

Figure 3:
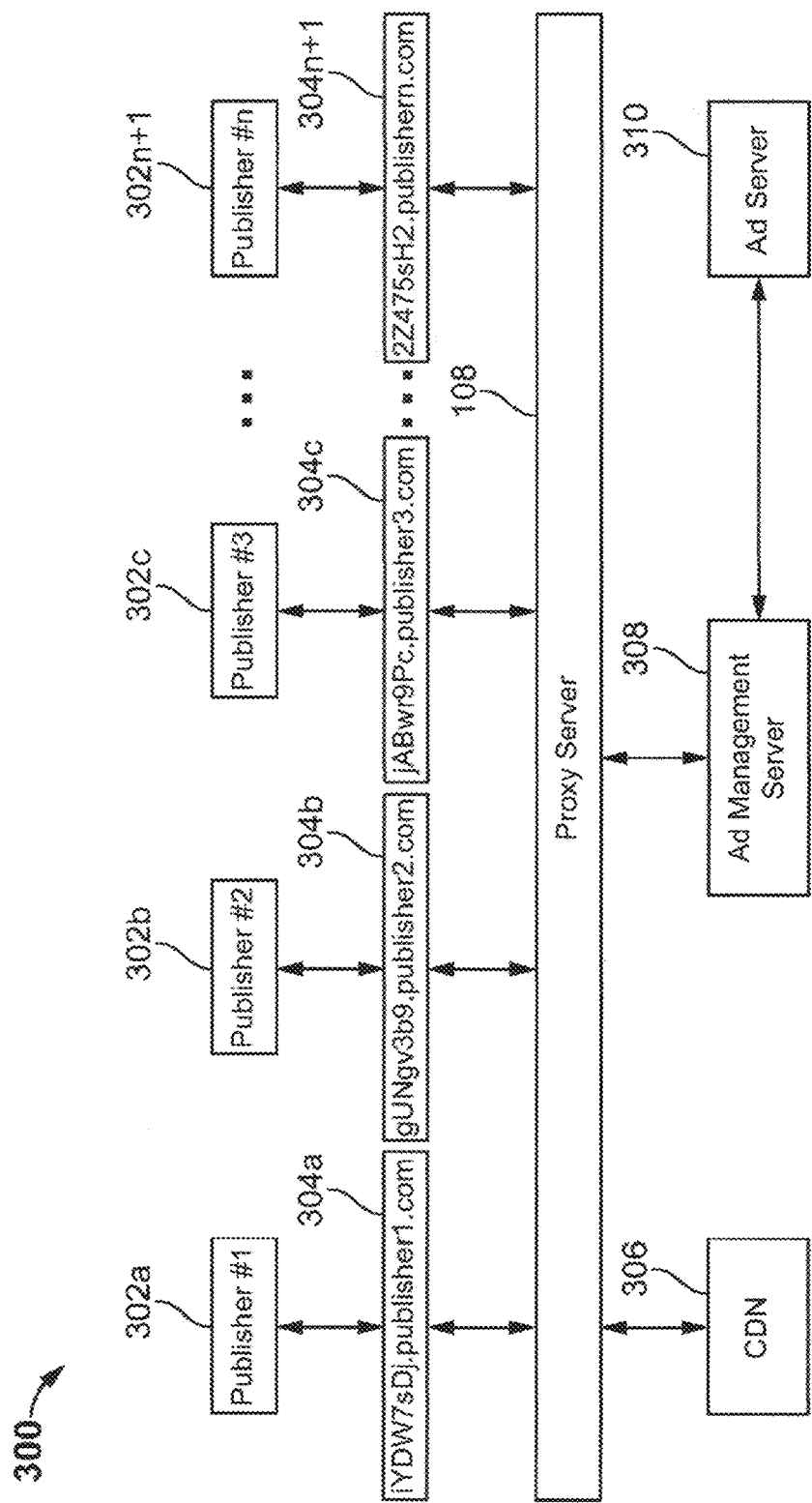
FIG. 3 illustrates the operating environment of the system to circumvent advertisement blockers, according to another embodiment of the present invention.

Referring now to FIG. 3, an operating environment 300 of the system to circumvent advertisement blockers is disclosed. Publishers such as publisher #1 302a, publisher #2 302b, publisher #3 302c, publisher #n 302n+1, receives website content request. The publishers request a configuration to the proxy server 108, which has a pre-defined random domain name, using the Publisher's Top-Level Domain (TLD)—for example, iydw7sdj.publisher1.com 304a, gungv3b9.publisher2.com 304b, jabwr9pc.publisher3.com 304c, and 2z475sh2.publishern.com 304n+1. Based on the request made to the proxy server 108, the proxy server accesses CDN 306, ad management server 308 and ad server 310. In operation, the proxy server 108 will return the ad block detection widget to the Publisher's web page. The ad block detection widget will determine if an ad blocker is active on the consumer's browser and, if active, will make a second or additional request for the ad block configuration from the ad management server 308. Based on the pre-defined domain name of the requesting proxy server 108, the ad management server 308 is able to determine which publisher/website is making the request and configure the page block modal accordingly (via CSS or JavaScript for example). The ad management server 308 will make a request to the ad server 310 for the ad unit to display in the page block modal. The proxy server 108 will make additional requests to the CDN 306 for assets (images, video, etc.) required by the ad unit. The complete ad will then be relayed by the proxy to the ad block detection widget for subsequent rendering (and content obfuscation) on the web page displayed in the consumer's browser.

Figure 4:
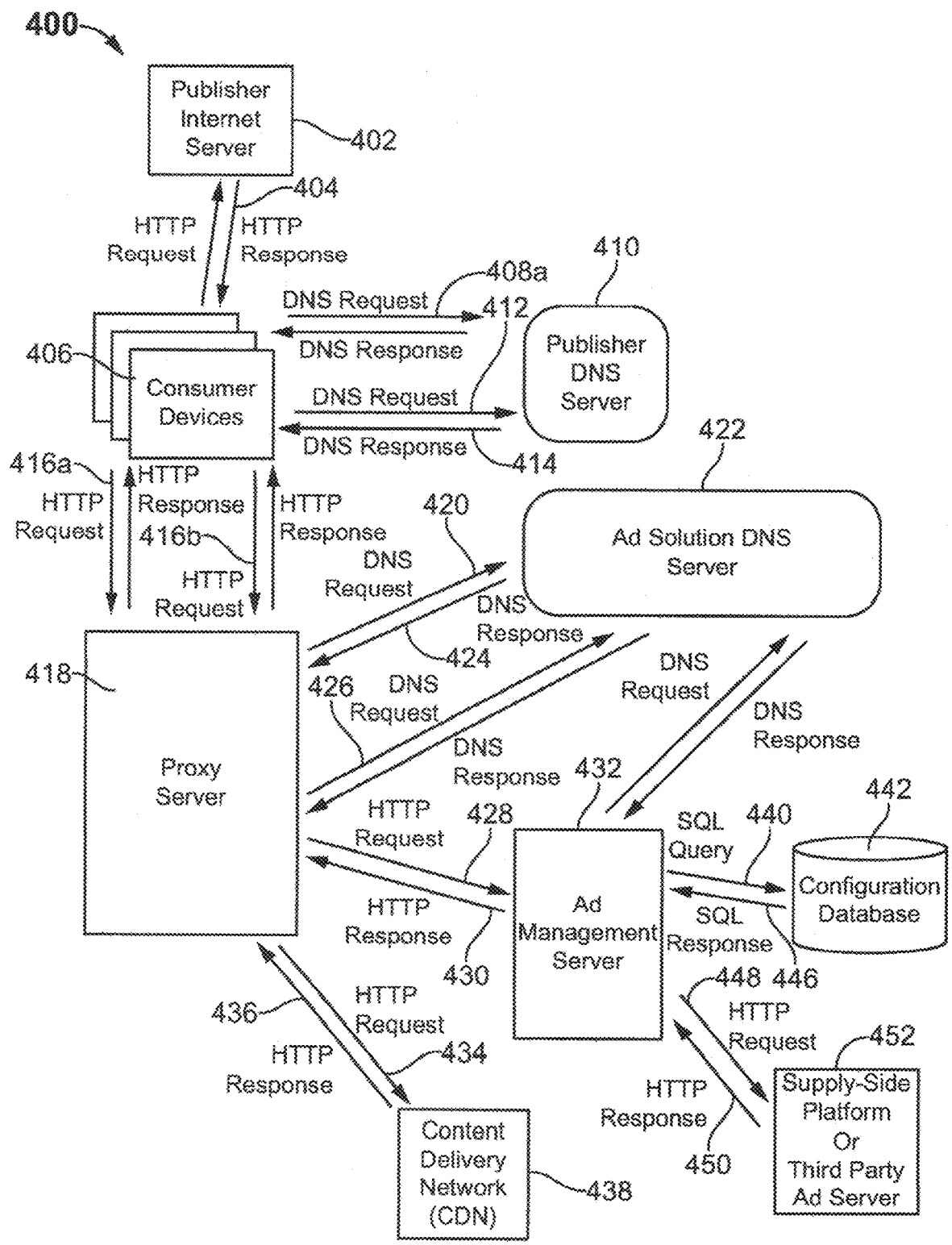
FIG. 4 illustrates the operating environment of the system to circumvent advertisement blockers, according to yet another embodiment of the present invention.

Referring to FIG. 4, an operating environment 400 of the system to circumvent advertisement blockers is disclosed. The operating environment 400 comprises one or more consumer devices 406 configured to access publisher internet server 402, via HTTP request and HTTP response 404, publisher DNS server 410, via DNS request and DNS response (408, 412 and 414) and a proxy server 418 via HTTP request and HTTP response (416a and 416b). The proxy server 418 is in communication with the advertisement management server 432, via HTTP request and HTTP response (428 and 430), content delivery network (CDN) 438, via HTTP request and HTTP response (434 and 436), and Ad solution DNS server 422, via DNS request and DNS response (420, 424 and 426). Further, the advertisement management server 432, via DNS request and DNS response, is in communication with the Ad solution DNS server 422. Based on the request from the consumer devices 406, the proxy server 418 access the advertisement management server 432, content delivery network 438, and Ad solution DNS server 422. The ad management server 432 is in communication with a configuration database 442, via SQL query and SQL response (440 and 446) and HTTP response (434 and 436) and a supply side platform or third-party ad server 452, via HTTP request and HTTP response (448 and 450).

Continuing with FIG. 4, the operational logic is described herein. A consumer enters the publisher's URL in their device's 406 browser. The browser will follow a Domain Name Resolution process to locate the Publisher Internet Server 402, which will contact via DNS request 408a the Publisher's DNS Server 410, which will respond (408b) with the IP address of the Publisher Internet Server 402. Once the IP address has been obtained, the consumer's browser at 402 will issue an HTTP Request 404 to the Publisher Internet Server 402, which will return the web page content in an HTTP Response 404. Contained in the web page content is the Ad Block Detector JavaScript file, which resides on the Proxy Server 418. The consumer's device 406 browser will make a second DNS request 412, the Publisher's DNS Server 410 will respond 414 with the IP Address of the Proxy Server 418. The Ad Block Detector JavaScript will be loaded into the Consumer's Browser 406 via an HTTP Request/Response 416a to the Proxy Server 418.

When the Ad Block Detection JavaScript code executes on the Consumer's Browser 406 and detects an ad blocker, it will make an HTTP Request 416b to the Proxy Server 418 for the page block modal content. The Proxy Server 418 will use the standard Domain Name Resolution process to determine the location of the Ad Management Server 432, contacting (420 and 424) the Ad Solution DNS Server 422 to obtain the IP Address of the Ad Management Server 432. The Proxy Server 418 will then make an HTTP Request 428 to the Ad Management Server 432 for the page block modal configuration. The Ad Management Server 432 will—based on the requesting domain name of the Proxy Server 418—issue an SQL Query (440) to the Configuration Database 442 to obtain the publisher's/site's configuration details, which are return in the SQL Response 446. Based on the configuration details, the Ad management Server 432 will make an HTTP Request 448 to either a Supply-Side Platform (Programmatic advertisement) or a Third-Party Ad Server 452, which will return the ad unit in an HTTP Response 450. The Ad Management Server 432 will return the page block modal configuration and the ad unit details to the Proxy Server 418 in an HTTP Response 430.

The Proxy Server 418 will use the Domain Name Resolution process to determine the location of the Content Delivery Network (CDN) 438, contacting 426 the Ad Solution DNS Server 422 to obtain the IP Address of the Content Delivery Network (CDN) 438. The Proxy Server 418 will make and HTTP Request (434) to the Content Delivery Network (CDN) 438 for the ad unit media files, which will be returned in an HTTP Response 436. The Proxy Server 418 will return (via an HTTP Response 416b) the page block modal configuration, the ad unit and the ad unit media files to the Ad Block Detection JavaScript for subsequent rendering and content obfuscation.

Figure 5:
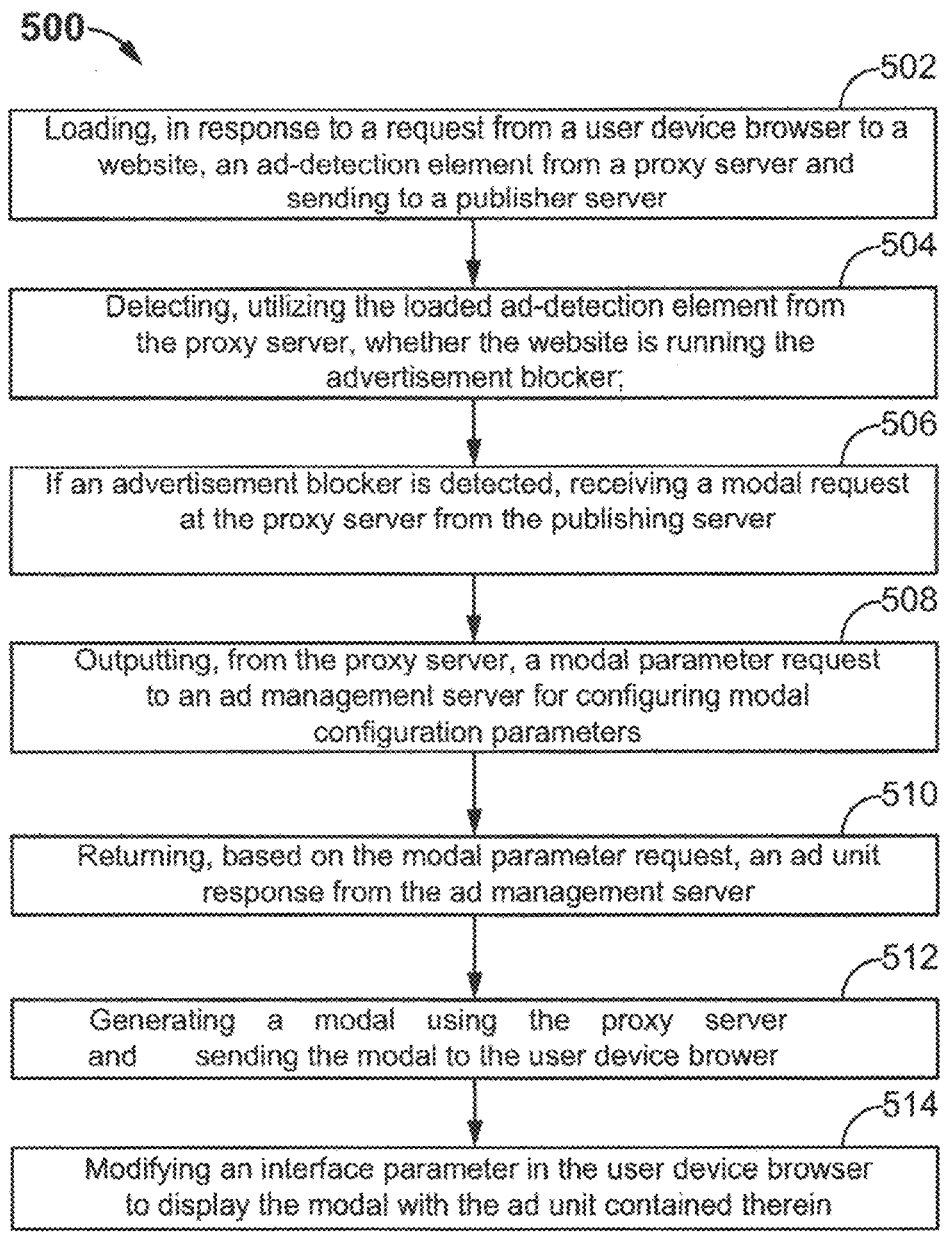
FIG. 5 illustrates a flowchart of the method to circumvent advertisement blockers, according to an embodiment of the present system.

Now referring to FIG. 5, a flowchart of the method 500 to detect and circumvents advertisement blockers is shown. At step 502, the method provides loading, in response to a request from a user device browser to a website, an ad-detection element from a proxy server and sending to a publisher server is provided. At step 504 the method provides detecting, utilizing the loaded ad-detection element from the proxy server, whether the website is running the advertisement blocker. At step 506, the method provides if an advertisement blocker is detected, receiving a modal request at the proxy server from the publishing server. At step 508, the method provides outputting, from the proxy server, a modal parameter request to an ad management server for configuring modal configuration parameters. At step 510, the method provides returning, based on the modal parameter request, an ad unit response from the ad management server having the configuration parameters. At step 512, the method provides generating a modal using the proxy server, and sending the modal to the user device browser for consumption by the user; and at step 514, the method provides modifying an interface parameter in the user device browser to display the modal with the ad unit contained therein.

Figure 6:
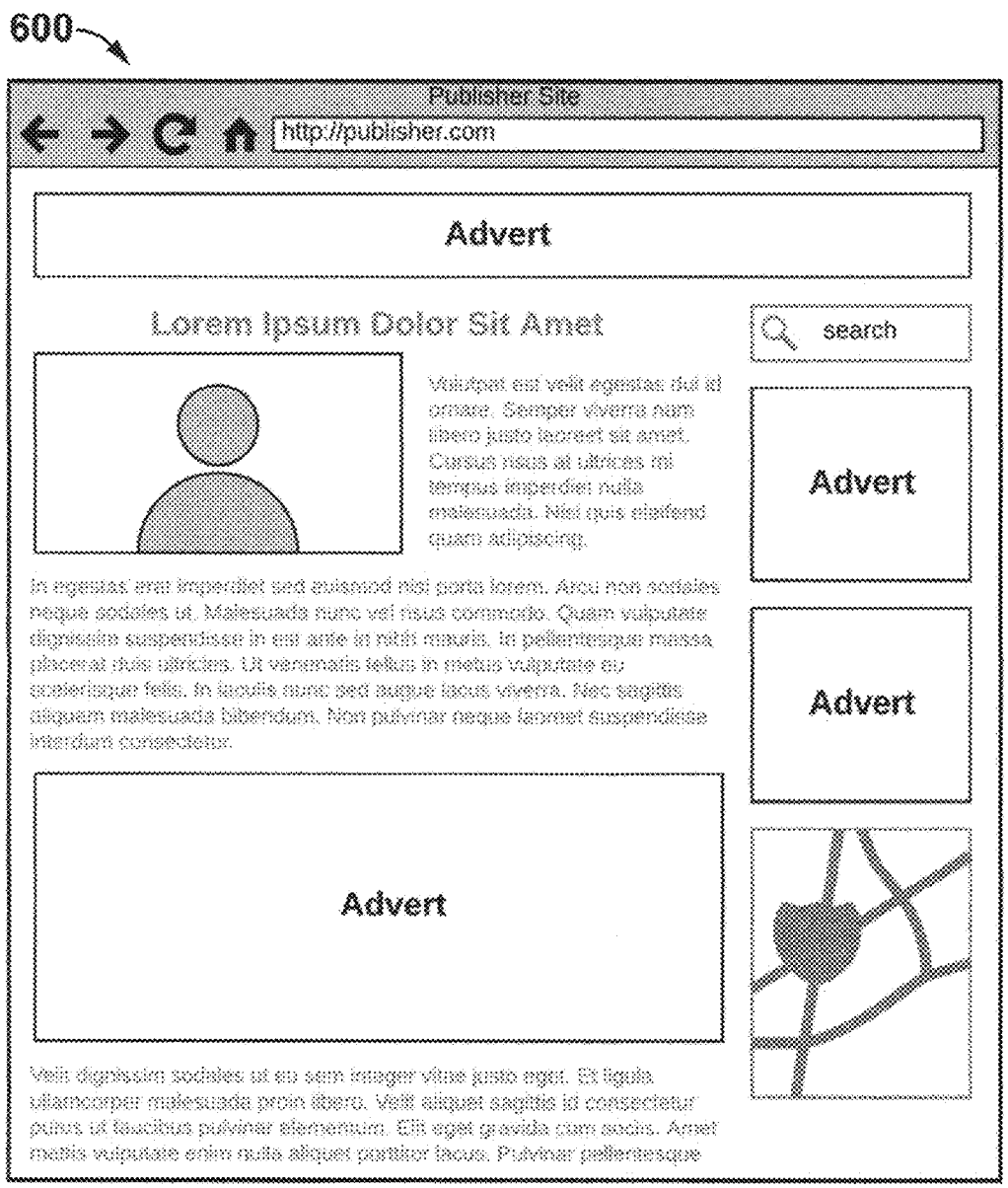
FIG. 6 illustrates a wireframe of a webpage displayed at an end user device without an advertisement blocker, according to an embodiment of the present system.
Figure 7:
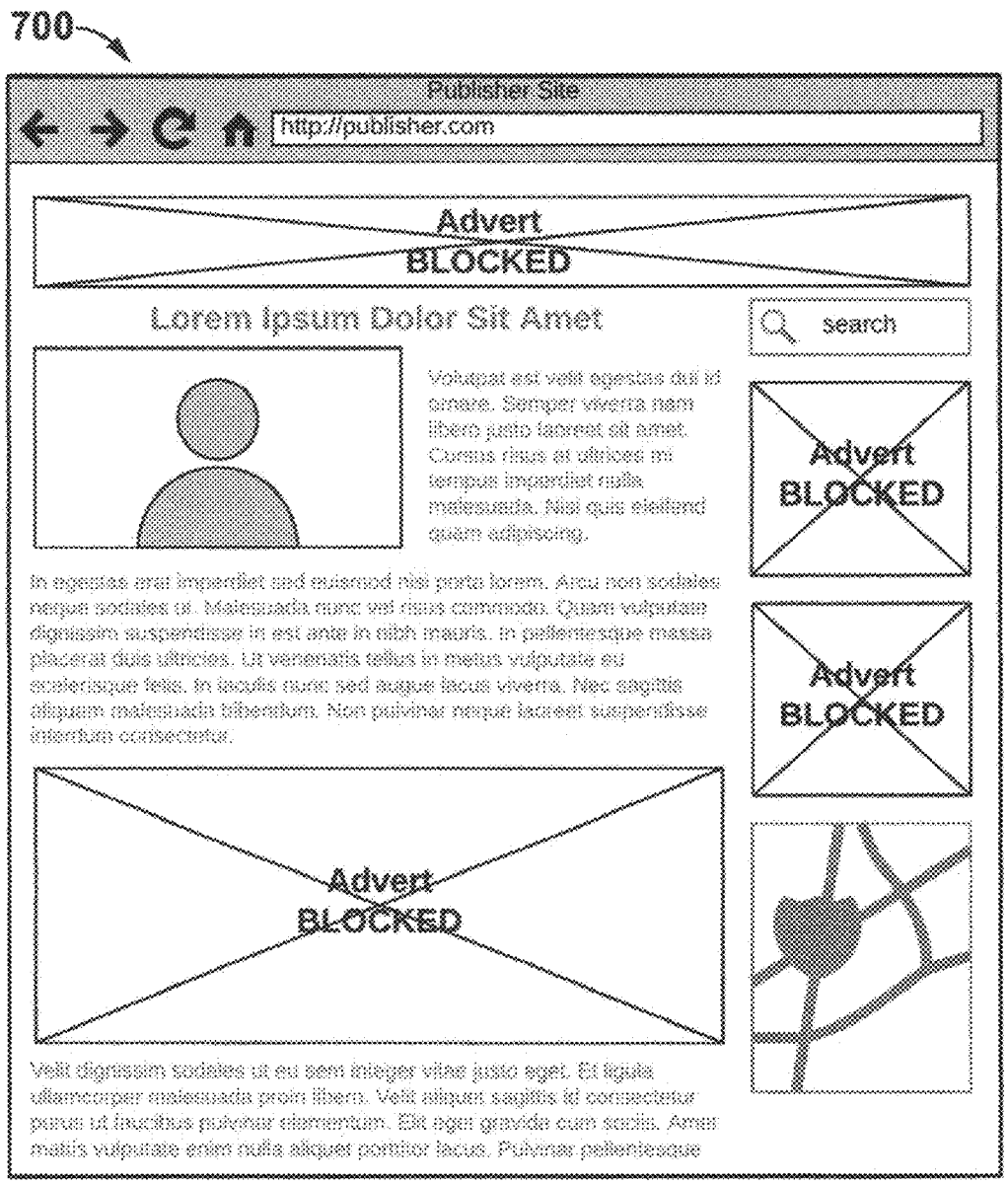
FIG. 7 illustrates a wireframe of a webpage displayed at an end user device comprising an advertisement blocker, according to an embodiment of the present system.
Figure 8:
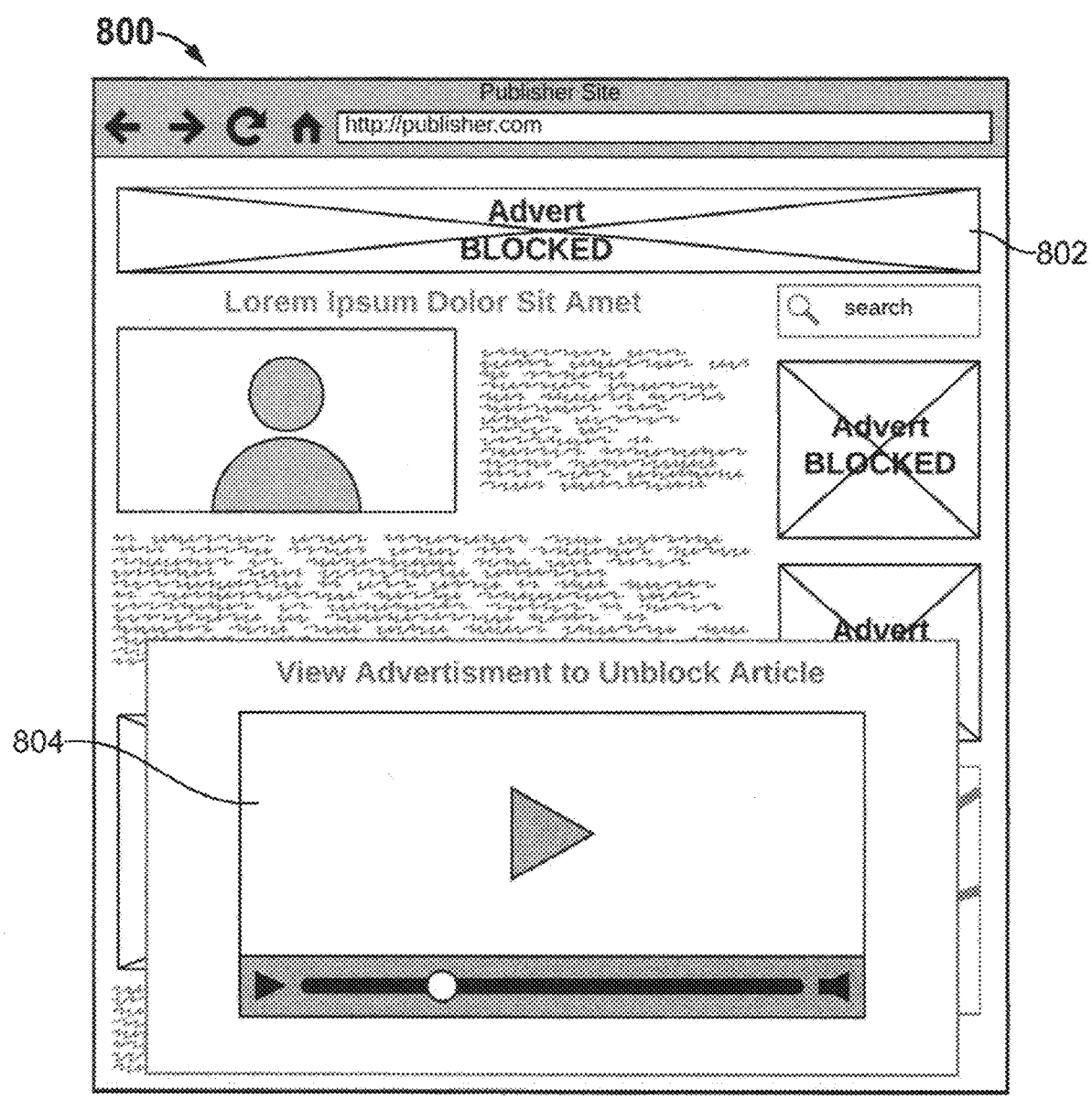
FIG. 8 illustrates a wireframe of a webpage displaying a modal and obfuscated editorial content, according to an embodiment of the present system.
Figure 9:
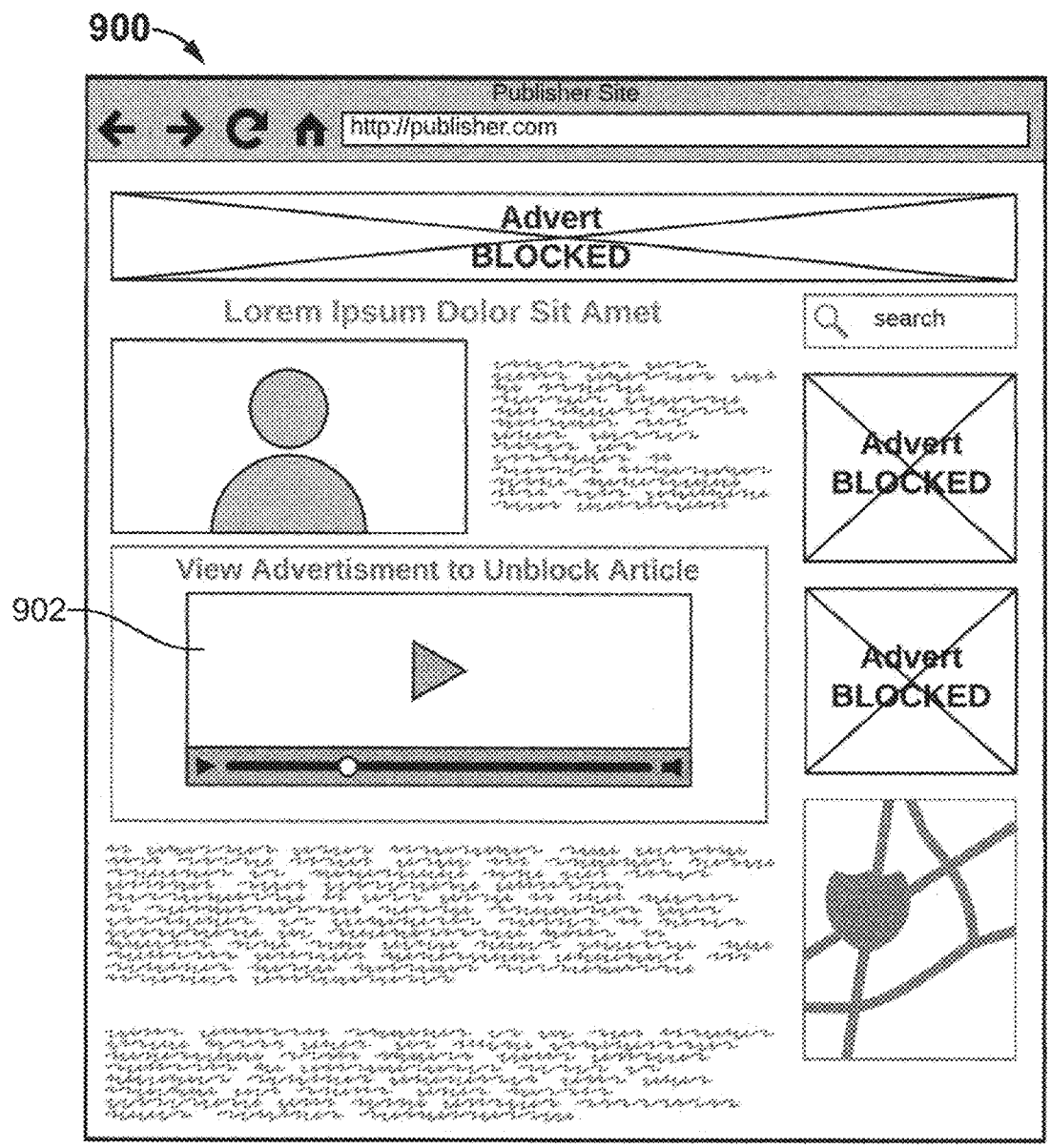
FIG. 9 illustrates a wireframe of a webpage displaying an inline ad unit and obfuscated editorial content, according to an embodiment of the present system.
Figure 10:
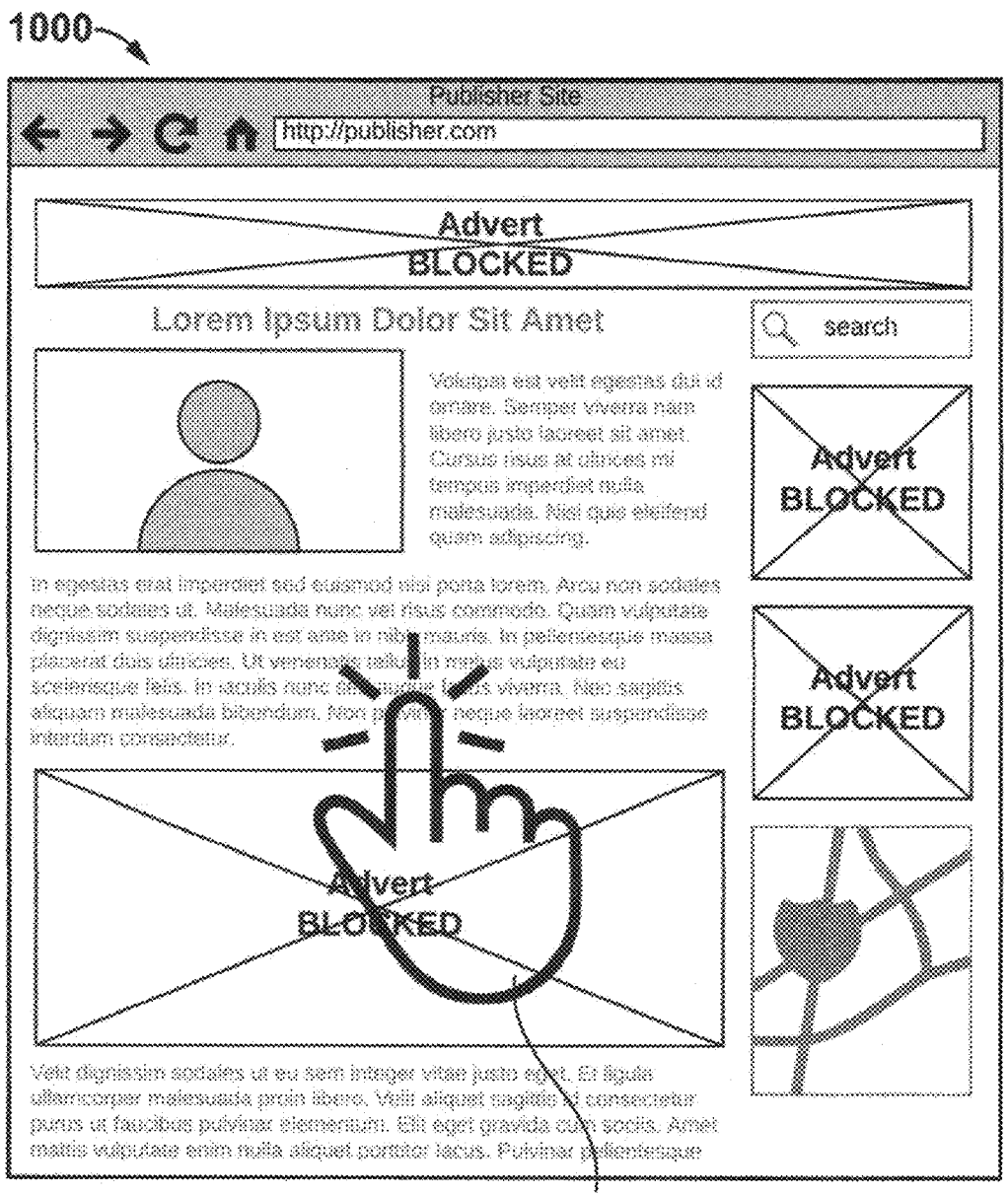
FIG. 10 illustrates a wireframe of un-obfuscated webpage content, according to an embodiment of the present system.

FIG. 6, FIG. 7 and to FIG. 8, illustrate websites wireframe (600, 700, 800) displayed during the process of circumventing advertisement blockers, according to an embodiment of the present system. The user using a standard web browser load a publisher site to obtain the website content. FIG. 6 is a wireframe 600 of a webpage or publisher website displayed at the end user device without an advertisement blocker is illustrated. The webpage contains editorial content, advertisements and navigation. If the user is using an ad-blocking browser extension, the advertisements on the webpage would be blocked, as illustrated in wireframe 700 of FIG. 7. The Ad Block Detection JavaScript running on the Publisher Site would (A) obfuscate the editorial content on the site and (B) reveal the modal to the consumer, as illustrated in wireframe 800 of FIG. 8. As illustrated by wireframe 900 of FIG. 9, the user has the option of unlocking the content by interacting with the advertisement (e.g. playing the video, engaging with the advertisement, making a micropayment, etc.). Once one of these actions has occurred, the modal would be removed from the site and the content would be un-obfuscated. As illustrated by wireframe 1000 of FIG. 10, the user has the option of unlocking the content by interacting with the advertisement (e.g. playing the video, engaging with the advertisement, making a micropayment, etc.) in an inline ad unit. Once one of these actions has occurred, the ad unit would be removed, an optional "leave behind" ad banner (or other ad content, such as a video, interactive JavaScript content, etc.) would replace the ad unit and the content would be un-obfuscated.

Figure 11:
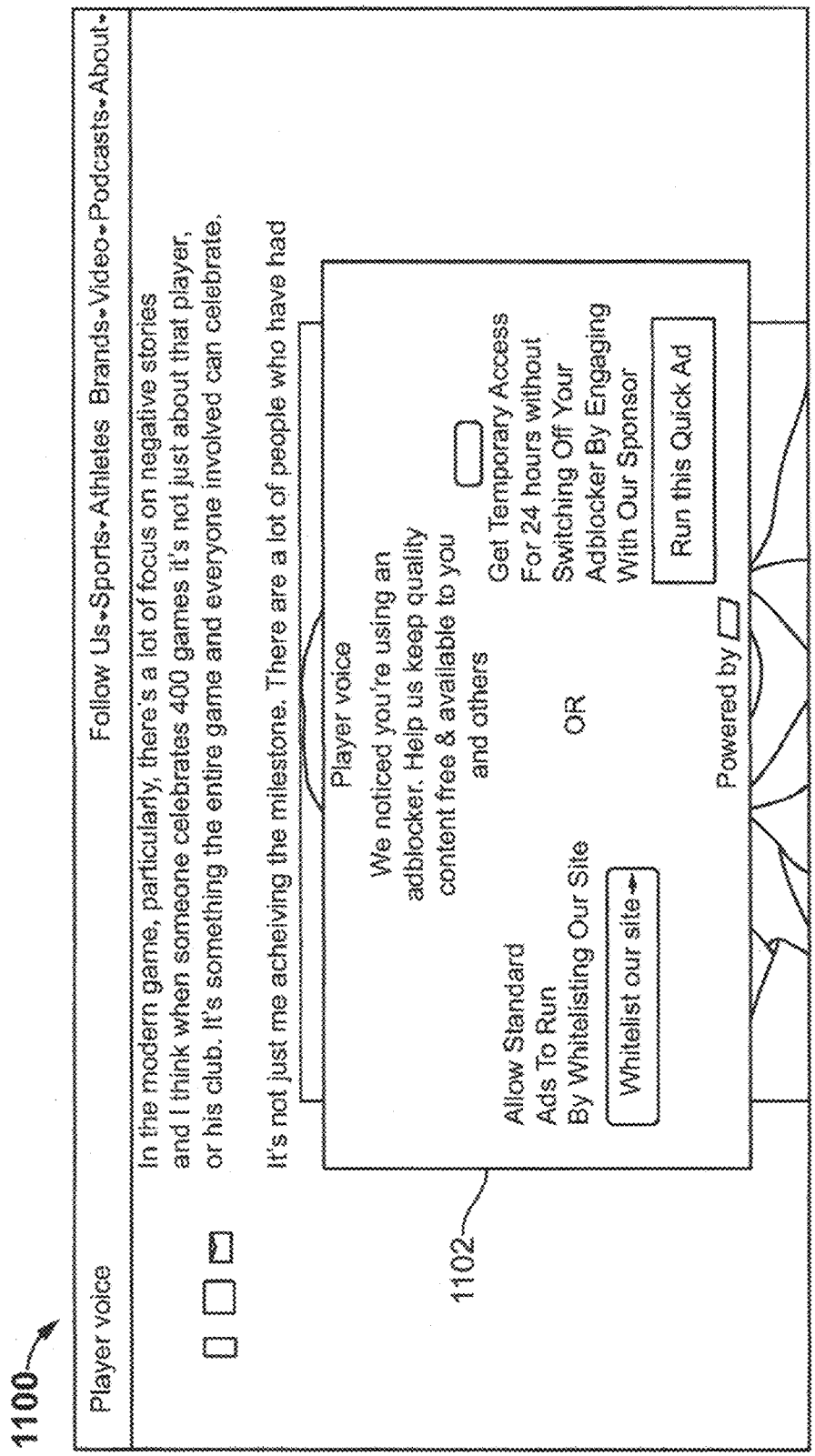
FIG. 11 illustrates a screenshot of a webpage displaying a modal, according to an embodiment of the present system.

Referring to FIG. 11, a screenshot 1100 of the webpage displays interactive modals 1102. The interactive modal 1102 includes instruction on whitelisting the publisher site in the advertisement block extension and instruction to obtain temporary access to webpage without switching of the advertisement block extension by engaging with the sponsor.

Figure 12:
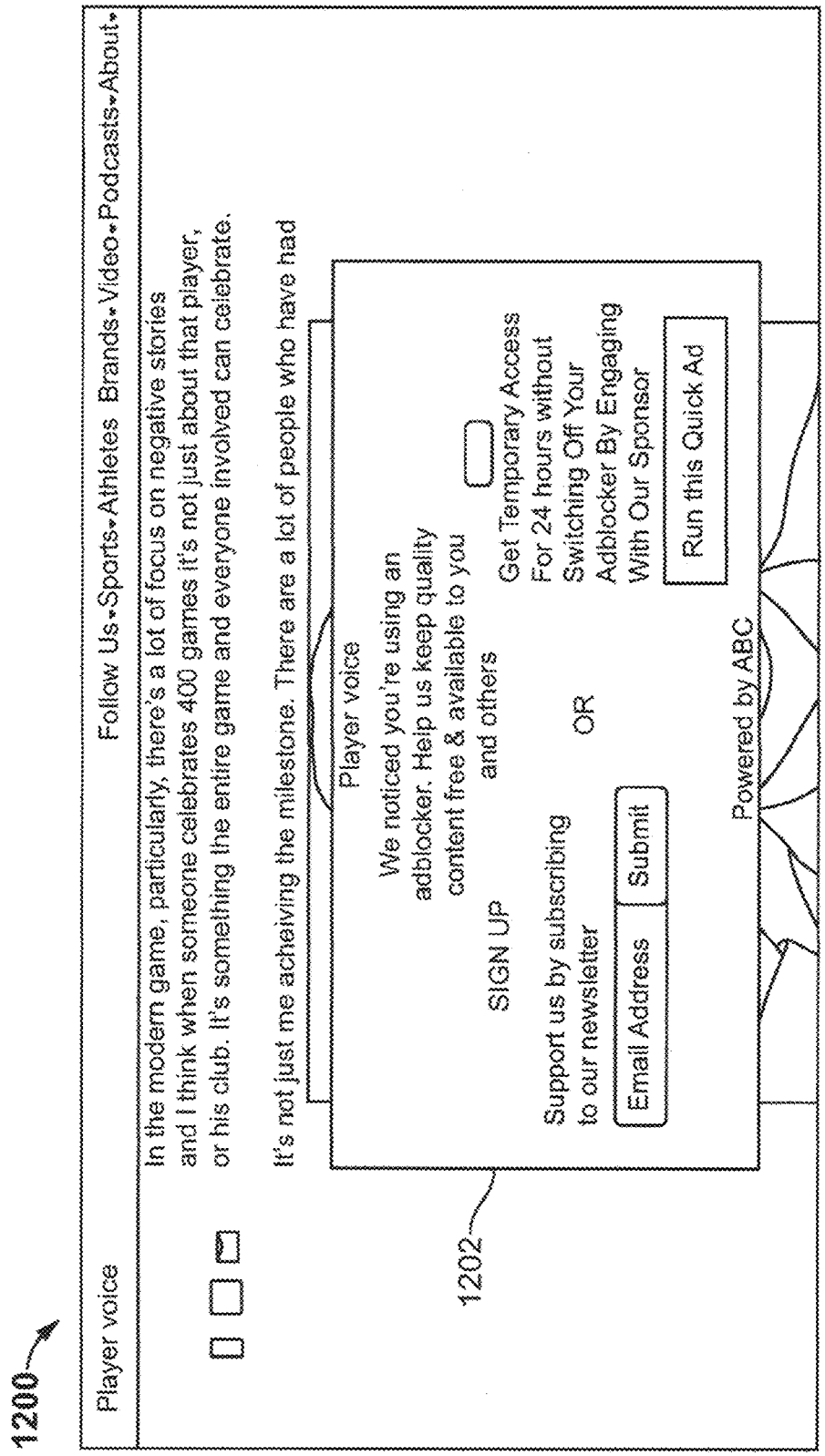
FIG. 12 illustrates a screenshot of a webpage displaying a modal, according to another embodiment of the present system.

Referring to FIG. 12, a screenshot 1200 of the webpage displays interactive modals 1202. The interactive modal 1202 includes instruction for subscribing to the publisher site to unlock the content of the webpage/website and instruction to obtain temporary access to webpage without switching of the advertisement block extension by engaging with the sponsor.

Figure 13:
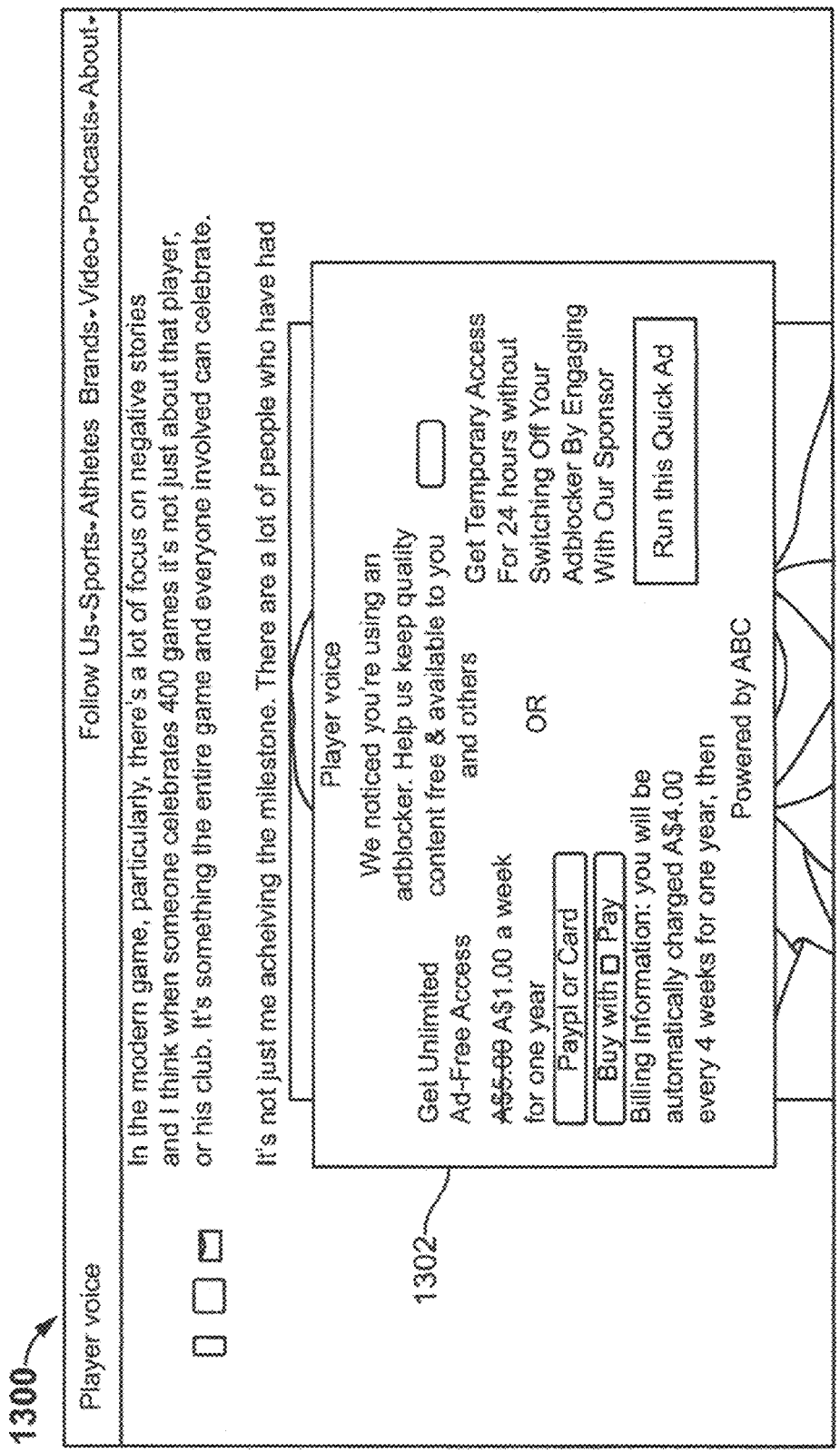
FIG. 13 illustrates a screenshot of a webpage displaying a modal, according to an embodiment of the present system.
Figure 14:
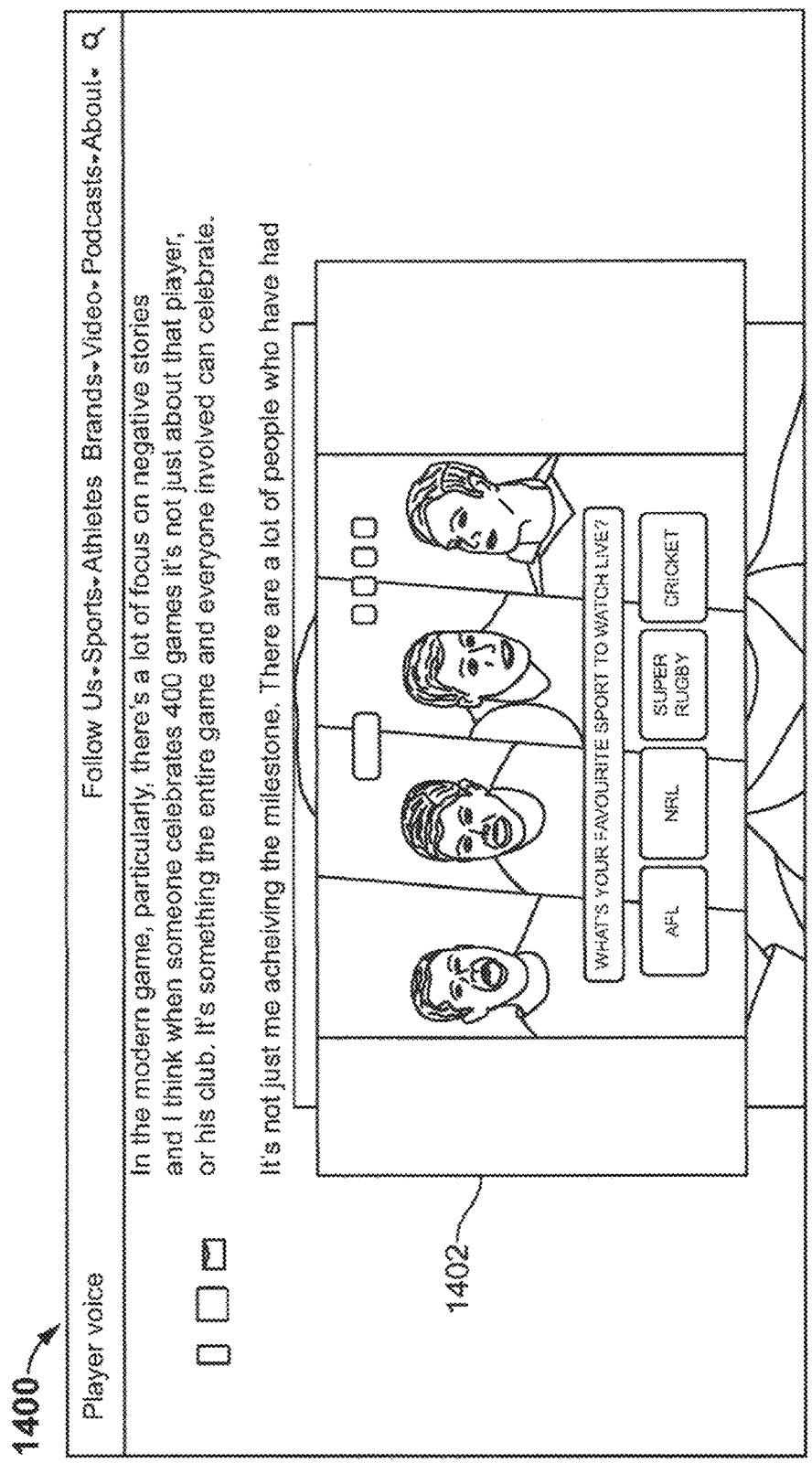
FIG. 14 illustrates a screenshot of a webpage displaying an advertisement modal, according to an embodiment of the present system.
Figure 15:
FIG. 15 illustrates a screenshot of a webpage, where the modal is removed on interacting with advertisement and the editorial content being displayed, according to an embodiment of the present.

Referring to FIG. 13, a screenshot 1300 of the webpage displays interactive modals 1302. The interactive modal 1302 includes instruction for a method for micropayment to unlock the content and instruction to obtain temporary access to webpage without switching of the advertisement block extension by engaging with the sponsor. FIG. 14 exemplarily illustrates a screenshot 1400 a webpage displaying an advertisement modal 1402, according to an embodiment of the present system. On interaction with the advertisement, the modal is removed and the editorial content is displayed in the webpage, as shown in a screenshot 1500 of FIG. 15.

According to the present system, the system and method is configured to bypass the advertisement blocker of both in browser and adblocker plugins to serve advertising platform on publishers' platform. The system and method automatically, effectively, and efficiently circumvent advertisement blockers. The system and method allow the user to select a convenient method to display advertisement while accessing the webpage and increase the revenue of the publishers. User is provided with a greater degree of control over their "ad-funded" experience while simultaneously having the publisher's needs appropriately contextualized. The present system provides more natural and native advertisement experience without the issues associated with sponsored content/advertorial. The present system removes publisher fear over displaying advertisement gates to users (because user has directly opted in)—may ultimately open up more net inventory and increase engagement rates even further.

According to the present system, the system is recovers lost revenue of publisher who utilize ad-blockers. Publisher-served advertisement gates solution provides ad-averse users a way to get temporary access without needing to switch off ad-blocker—thus increasing conversion rate on net user monetization, whilst also driving premium Average revenue per user (ARPU).

While the present system has been described in connection with what are presently considered to be the most practical and preferred embodiments, it is to be understood that the present system is not limited to these herein disclosed embodiments. Rather, the present system is intended to cover all of the various modifications and equivalent arrangements included within the spirit and scope of the appended claims.

Although specific features of various embodiments of the system may be shown in some drawings and not in others, this is for convenience only. In accordance with the principles of the system, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

We claim:

1. A method for circumventing an advertisement blocker on a communications network, the method comprising:
    loading, in response to a request from a user device browser to a website, an ad-detection element from a proxy server and sending to a publisher server;
    detecting, utilizing the loaded ad-detection element from the proxy server, whether the website is running the advertisement blocker;
    if an advertisement blocker is detected, receiving a modal request at the proxy server from the publishing server;
    outputting, from the proxy server, a modal parameter request to an ad management server for configuring modal configuration parameters;
    returning, based on the modal parameter request, an ad unit response from the ad management server having the configuration parameters;
    generating a modal using the proxy server;
    sending the modal to the user device browser for consumption by the user; and
    modifying an interface parameter in the user device browser to display the modal with the ad unit contained therein.

2. The method of claim 1, wherein:
    the interface parameter is a Document Object Model (DOM);
    the loading step occurs via HTTP request;
    the ad-detection element is an advertisement blocker detection JavaScript; and
    the modal request is performed via an API request.

3. The method of claim 1, further comprising making an ad unit request to a third-party ad server from the ad management server.

4. The method of claim 1, further comprising making an ad unit request to a supply-side platform from the ad management server.

5. The method of claim 1, wherein modifying an interface parameter comprises:
    replacing a website content text with encrypted characters;
    replacing a website font with an obfuscation font;
    replacing a website content text with an opaque overlay over a content;
    replacing the website content with instructions for subscribing to the website to unlock the website content.

6. The method of claim 1, wherein the proxy server is loaded with a plurality of pre-defined random sub-domain names using a publisher's top-level domain, and based on the pre-defined random sub-domain name of a requesting proxy server, the method further comprises:
    determining, via the ad management server, which website browser is making a request; and
    configuring the modal based on the request;
    wherein the subdomain is configured on a publisher DNS manager and is pointing to the proxy server.

7. The method of claim 6, further comprising providing filtering rules used to identify a source of the modal request and an endpoint to where the request will be relayed in the publisher DNS.

8. The method of claim 1, wherein the ad block detection element is a widget, and wherein the method further comprises relaying the modal to the ad block detection widget for subsequent rendering and content obfuscation on the webpage displayed in the browser.

9. The method of claim 7, wherein the detection step comprises accessing a content delivery network, the ad management server, and the ad server approximately concurrently and returning the ad block detection widget to the webpage.

10. A system for circumventing an advertisement blocker on a communications network, the system comprising:
    a proxy server having an ad-detection element residing thereon, wherein in response to a request from a user device browser to a website, the proxy server loads the ad-detection element;
    a publisher server in communication with the proxy server, wherein the publisher server requests the proxy server to detect an advertisement blocker, and further wherein the publisher serer receives the ad-detection element from the proxy server;
    wherein the proxy server:
    detects utilizing the loaded ad-detection element, whether the website is running the advertisement blocker;
    if an advertisement blocker is detected, receiving a modal request from the publishing server;

outputs a modal parameter request to an ad management server for modal configuration parameters;
receives, based on the modal parameter request, an ad unit response from the ad management server having the configuration parameters;
generates a modal; and
sends the modal to the user device browser for consumption by the user;
wherein the publishing server modifies an interface parameter in the user device browser to display the modal with the ad unit contained therein.

11. The system of claim 10, wherein:
the interface parameter is a Document Object Model (DOM);
the ad detection element is loaded via HTTP request;
the ad-detection element is an advertisement blocker detection JavaScript; and
the modal request is performed via API request.

12. The system of claim 10, further comprising a third-party ad server that receives an ad unit request.

13. The system of claim 10, further comprising a supply-side platform that receives an ad unit request.

14. The system of claim 10 wherein modifying an interface parameter comprises: replacing a
website content text with encrypted characters;
replacing a website font with an obfuscation font;
replacing a website content text with an opaque overlay over the content;
replacing the website content with instructions for subscribing to the website to unlock the website content.

15. The system of claim 10, wherein the proxy server is loaded with a plurality of pre-defined random sub-domain names using a publishers top-level domain, and based on the pre-defined random sub-domain name of the requesting proxy server, wherein the proxy server:
determines, via the ad management server, which website browser is making the request; and
configures the modal based on the request;
wherein the subdomain is configured on a publisher DNS manager and is pointing to the proxy server.

16. The system of claim 10, wherein the proxy server further provides filtering rules used to identify a source of the modal request and an endpoint to where the request will be relayed in the DNS.

17. The system of claim 10, wherein the ad block detection element is a widget, and wherein the system relays the modal to the ad block detection widget for subsequent rendering and content obfuscation on the web site displayed in the browser.

18. The system of claim 17, wherein proxy server accesses a content delivery network, the ad management server, and the ad server approximate concurrently and returning an ad block detection widget to the website.

19. A non-tangible, computer-readable medium storing instructions, that, when executed by a processor, cause the processor to perform a method to circumvent advertisement blocking over a communication network, the method comprising:
loading, in response to a request from a user device browser to a website, an ad-detection element from a proxy server and sending to a publisher server;
detecting, utilizing the loaded ad-detection element from the proxy server, whether the website is running the advertisement blocker;
if an advertisement blocker is detected, receiving a modal request at the proxy server from the publishing server;
outputting, from the proxy server, a modal parameter request to an ad management server for configuring modal configuration parameters;
returning, based on the modal parameter request, an ad unit response from the ad management server having the configuration parameters;
generating a modal using the proxy server;
sending the modal to the user device browser for consumption by the user; and
modifying an interface parameter in the user device browser to display the modal with the ad unit contained therein.

20. The method of claim 19, wherein:
the interface parameter is a Document Object Model (DOM);
the loading step occurs via an HTTP request;
the ad-detection element is an advertisement blocker detection JavaScript; and
the modal request is performed via an API request.

* * * * *